(12) United States Patent
Smith et al.

(10) Patent No.: US 8,608,114 B2
(45) Date of Patent: Dec. 17, 2013

(54) PLATFORM AND LAUNCH INITIATION SYSTEM FOR SECONDARY SPACECRAFT FOR LAUNCH VEHICLE

(75) Inventors: Philip Smith, San Diego, CA (US); James England, Highlands Ranch, CO (US); Michael Darmody, San Diego, CA (US); Jack Rubidoux, La Mesa, CA (US)

(73) Assignee: HKM Enterprises Inc., Denver, CO (US)

( * ) Notice: Subject to any disclaimer, the term of this patent is extended or adjusted under 35 U.S.C. 154(b) by 318 days.

(21) Appl. No.: 13/066,471

(22) Filed: Apr. 15, 2011

(65) Prior Publication Data

US 2012/0261515 A1 Oct. 18, 2012

(51) Int. Cl.
*B64G 1/00* (2006.01)
*B64G 1/22* (2006.01)

(52) U.S. Cl.
USPC ..................................... 244/173.3; 244/173.1

(58) Field of Classification Search
USPC ................................. 244/173.1, 173.2, 173.3
See application file for complete search history.

(56) References Cited

U.S. PATENT DOCUMENTS

| | | | |
|---|---|---|---|
| 3,380,687 A | 4/1968 | Wrench et al. | |
| 4,132,373 A | 1/1979 | Lanag | |
| 5,040,748 A | 8/1991 | Torre et al. | |
| 5,152,482 A * | 10/1992 | Perkins et al. | 244/173.1 |
| 5,199,672 A | 4/1993 | King et al. | |
| 5,271,582 A | 12/1993 | Perkins et al. | |
| 5,411,226 A | 5/1995 | Jones et al. | |
| 5,605,308 A | 2/1997 | Quan et al. | |
| 5,613,653 A | 3/1997 | Bombled et al. | |
| 5,720,450 A | 2/1998 | Kanne | |
| 6,138,951 A * | 10/2000 | Budris et al. | 244/173.3 |
| 6,237,496 B1 * | 5/2001 | Abbott | 244/3.24 |
| 6,276,639 B1 | 8/2001 | Hornung et al. | |
| 6,296,206 B1 | 10/2001 | Chamness et al. | |
| 6,357,698 B1 | 3/2002 | DiVerde et al. | |
| 6,416,018 B2 | 7/2002 | DiVerde et al. | |
| 6,789,767 B2 | 9/2004 | Mueller et al. | |
| 6,845,949 B2 | 1/2005 | Blackwell-Thompson et al. | |

(Continued)

FOREIGN PATENT DOCUMENTS

| | | |
|---|---|---|
| DE | 60028 633 T2 | 6/2006 |
| EP | 1 655 223 | 5/2006 |
| EP | 1 038 772 | 6/2006 |

OTHER PUBLICATIONS

M. Lancho, J. Larrauri, V. Gomez-Molinero; "CRSS: A Separation System for Launching Very Heavy Payloads", Acta Astronautica vol. 47, Nos. 2-9, pp. 153-162, 2000.

(Continued)

*Primary Examiner* — Philip J Bonzell
*Assistant Examiner* — Marc Burgess
(74) *Attorney, Agent, or Firm* — John L. Rogitz (57) ABSTRACT

A platform and launch initiation control system for secondary spacecraft for a launch vehicle includes an aluminum honeycomb core sandwiched between top and bottom structural aluminum skins and strengthened by a spider-like stiffener. Spool inserts for engaging the secondary spacecraft are arranged on the platform. A computer processor based auxiliary payload support unit (APSU) is provided on the platform and receives power and enable signals through a single cable from the LV to permit the APSU to control the release of the secondary spacecraft transparently to the LV without impacting LV operations.

5 Claims, 7 Drawing Sheets

(56) References Cited

U.S. PATENT DOCUMENTS

| | | | |
|---|---|---|---|
| 7,036,773 B2 * | 5/2006 | Caldwell | 244/173.3 |
| 7,093,805 B2 | 8/2006 | Blackwell-Thompson et al. | |
| 7,114,683 B2 | 10/2006 | Hall | |
| 7,222,823 B2 | 5/2007 | Thomas et al. | |
| 7,434,767 B2 | 10/2008 | Smith et al. | |
| 7,484,693 B2 * | 2/2009 | Eng | 244/173.3 |
| 2002/0000495 A1 | 1/2002 | DiVerde et al. | |
| 2003/0136881 A1 | 7/2003 | Beyer | |
| 2004/0016852 A1 | 1/2004 | Blackwell-Thompson et al. | |
| 2006/0192057 A1 | 8/2006 | Smith et al. | |
| 2008/0149777 A1 | 6/2008 | Benedict et al. | |

OTHER PUBLICATIONS

Joseph R. Maly, Vann M. Stavst, Gregory E. Sanford, Nichael E. Eert, "Adapter Ring for Small Satellites on Responsive Launch Vehicles", 7th Responsive Space Conference RS7-2009-1006, Apr. 27-30, 2009.

Joseph R. Maly, Paul S. Wilke, Emily C. Fowler, Capt. S. A. Haskett, Dino Sciulli, T.E. Meink, "ESPA: EELV Secondary Payload Adapter with Whole-Spacecraft Isolation for Primary and Secondary Payloads", SmartStructures and Materials: Passive Damping and Isolation, Mar. 2000.

Spacex Space Exploration Techologies, Falcon 1 Launch Vehicle Payload User's Guide, Rev. 7, 50 pages.

T.L. Segura, A.S. Lo, H. Eller, D. Dailey, E. Drucker, J. Wehner, 41st Lunar and Planetary Science Conference (2010).

Steve Wichman, "Testbed for Responsive Experiments and Demonstrations in Space (TREADS) Concept of Operations", Redefine Technologies, Rev. 1.4, p. 1-7.

* cited by examiner

Figure 15 APSU Functional Architecture

Parabolic Arch

Figure 18

Elliptical Arch

Figure 19

Triangular Arch

Figure 20

Segmental Arch

Figure 21

PLATFORM AND LAUNCH INITIATION SYSTEM FOR SECONDARY SPACECRAFT FOR LAUNCH VEHICLE

FIELD OF THE INVENTION

The present application relates generally to platforms and launch initiation systems for secondary spacecraft for launch vehicles (LV).

BACKGROUND OF THE INVENTION

As satellites become increasingly miniaturized along with electronics in general, it has become possible and economically desirable to use excess volume and weight capacity in launch vehicles (LV) to carry auxiliary payloads (AP), essentially small secondary space vehicles (SV) incorporating satellites of various uses and capabilities. Depending on their weight, such small satellites may be classified as pico spacecraft, nano spacecraft, micro spacecraft, or mini spacecraft. By piggybacking APs onto LVs having an otherwise independent mission, the costs for placing a small satellite into space are greatly reduced, making space-based resources available to a much larger market.

As understood herein, it is desirable that APs be technically and programmatically transparent to the primary spacecraft and that APs impose no technical or contractual risk, including the risk of delaying launch schedules, to the primary spacecraft and its mission. It is further desirable that more than one AP be accommodated when appropriate, e.g., when multiple picos, nanos, micros or minis can be included as APs on a launch vehicle, without undue technical complexity in arranging the AP in the available area of the LV and without requiring undue coordination between individual manufacturers of APs.

SUMMARY OF THE INVENTION

Accordingly, an assembly for supporting one or more auxiliary payloads (AP) in a launch vehicle (LV) delivering the AP into space includes a deck comprised of a core sandwiched between top and bottom structural skins and a stiffener coupled to the core and formed with plural stiffening arms oriented radially relative to the core. Engagement inserts configured to releasably engage a separation device of the AP are arranged on the deck.

If desired, the core may be made of aluminum honeycomb and can be disk-shaped. The aluminum honeycomb core defines a honeycomb ribbon direction and the honeycomb ribbon direction preferably is radial. The stiffener may fit snugly within slots formed in the core. The slots can be shaped complementarily to the stiffener, with a surface of the stiffener being flush with a surface of the core.

If desired the core and the combined structural skins may formed into a frustum of a right circular cone. Alternatively the combined core and skins may form a dome having an elliptical arch, parabolic arch, triangular arch or segmental arch vertical cross section when viewed through the apex of the doom. Alternatively the combined core and skins may be free formed into a shape to support APs at one or more points on the structural form.

In example embodiments the stiffener has a central opening that is coaxial with the core and that is circumscribed by a central enclosed hollow ring. At least some of the stiffening arms extend radially outwardly from the central enclosed hollow ring. The engagement inserts can be received in registered sets of insert holes in the skins, stiffener, and core in one or more circles.

Additionally, LV interface fittings may be arranged along the outer periphery of the core. Respective fasteners can extend through respective fastener holes in at least one of the skins, into a respective fitting, and can be engaged with structure on the LV to securely hold the assembly to the LV. The skins, stiffener, and core may be bonded together by an adhesive injected as a fluid before it hardens thereby filling in interior spaces in the core. Or, the stiffener and core can be made integrally with each other.

In another aspect, a auxiliary payload support unit (APSU) for coordinating release of at least one auxiliary payload (AP) from an AP support assembly in a launch vehicle (LV) includes a processor, a communications interface between APSU and the LV, and a computer readable data storage medium accessible to the processor. The APSU communicates with the LV through one and only one cable and receiving commands and power therethrough. The APSU also receives, post-launch of the LV, an enable signal from the LV prior to which the APSU cannot begin executing a launch sequence for any AP such that the LV controls when the APSU begins executing AP release but does not thereafter have to command or communicate anything to the APSU regarding AP release, relieving the LV of the burden of controlling launch of the AP.

In this aspect, if desired the processor, responsive to the enable signal, enables power switching to the AP such that a separation device of the AP is energized as appropriate to ensure AP launch on schedule. The processor may receive from the AP a separation signal indicating AP separation from the AP support assembly. The processor, responsive to receiving the separation signal, can determine whether another AP awaits release from the AP support assembly and if so, the processor enables release of the AP. Otherwise, the APSU deenergizes itself.

In another aspect, an auxiliary payload (AP) support assembly includes a disk-shaped core configured for holding one or more APs and plural fittings arranged along the periphery of the core and configured for engaging structure of a launch vehicle (LV) to secure the core to the LV. A controller assembly is coupled to the core and is configured for electrically communicating with the LV to receive power therefrom. The controller assembly is also configured to receive, post-launch of the LV, an enable signal from the LV prior to which the controller assembly cannot begin executing a launch sequence for any AP such that the LV controls when the controller assembly begins executing AP release from the LV but does not thereafter command or communicate anything to the controller assembly regarding AP release.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
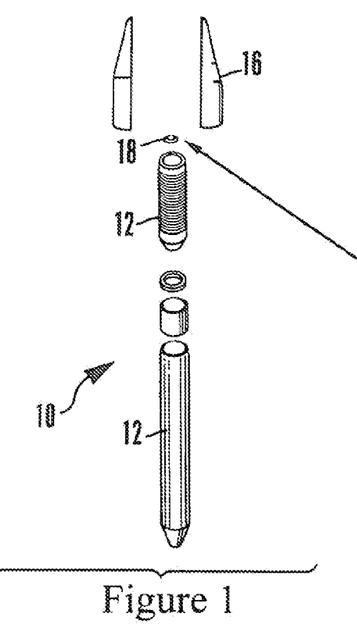
FIG. 1 is an exploded perspective view of a launch vehicle (LV) showing an example platform and launch initiation system, with the primary spacecraft omitted for clarity.
Figure 2:
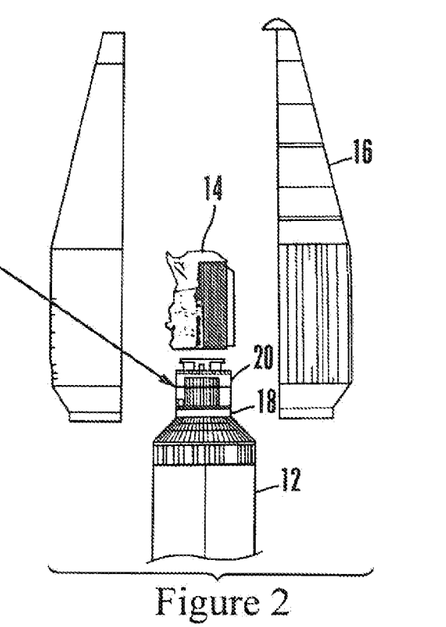
FIG. 2 is a more detailed perspective view of the LV shown in FIG. 1 including the primary spacecraft.
Figure 3:
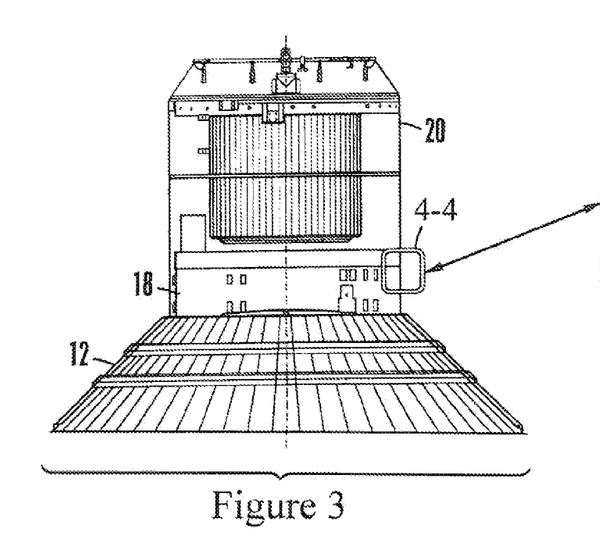
FIG. 3 is a perspective view of the platform and launch initiation system of FIG. 1.
Figure 4:
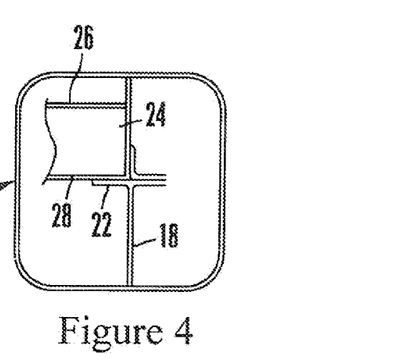
FIG. 4 is a side view detail taken at 4-4 in FIG. 3.

Referring initially to FIGS. 1-4, a launch vehicle 10 such as but not limited to an Atlas V rocket or a Delta IV rocket can have multiple booster stages 12 for carrying into space a primary spacecraft 14 (FIG. 2), typically enclosed within separable fairings 16 that part from each other once in space to permit release of the primary spacecraft 14. A cylindrical ring-shaped primary spacecraft adapter 18 may be provided between the uppermost booster stage 12 and primary spacecraft 14 for engaging the below-described AP platform system which supports one or more APs 20. As best shown in FIG. 4, the primary spacecraft adapter 18 can be circumscribed around its upper edge with an inner annular flange 22 formed with bolt holes (not shown in FIG. 4), e.g., 121 bolt holes, to which the below-described AP platform system 50 including, in example embodiments, an aluminum honeycomb cylindrical core 24 sandwiched between top and bottom structural aluminum skins 26, 28 is fastened.

Figure 5:
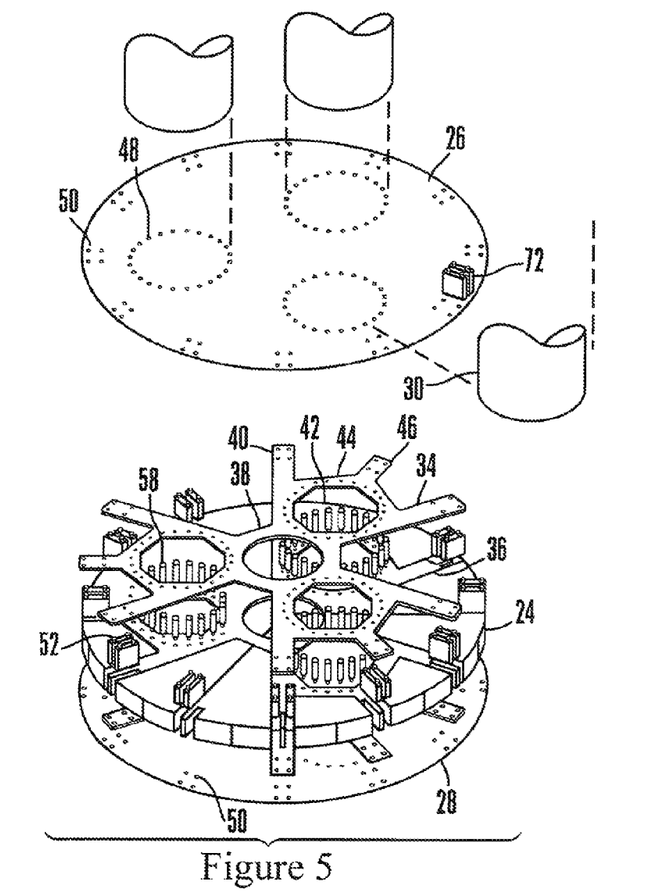
FIG. 5 is an exploded perspective view of an example platform configured for three secondary spacecraft, with the secondary spacecraft partially broken away.
Figure 6:
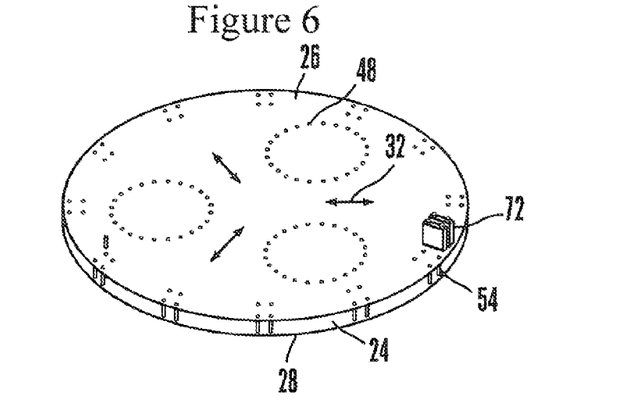
FIG. 6 is a perspective view of the platform shown in FIG. 5, with the spool inserts removed for clarity.

FIGS. 5 and 6 illustrate an embodiment of the AP platform system which supports three APs 30, it being understood that the AP platform can be configured to support greater or fewer APs in accordance with principles set forth herein. As shown, the core 24, which in one implementation is made of aluminum honeycomb, is cylindrical with opposed substantially continuous plane circular faces. In the example shown, as schematically indicated by the arrows 32 the honeycomb ribbon direction preferably is radial, i.e., the direction of the ribbons of the honeycomb lie along radials of the core 24. In example non-limiting embodiments the core 24 may be composed of three equally-sized pie-shaped portions that are bonded to each other using an adhesive such as but not limited to FM410 adhesive. The core 24 may be made of Hexcel ⅛-5052-.002-8.1 pcf and may be 3.624 inches thick, although these characteristics are not limiting. The core 24 may further be machined to provide clearance for the below-described stiffener and inserts.

With more specificity, a web-like stiffener 34 may be provided to stiffen the structure and in particular reduce or eliminate as many vibrations below frequencies of fifty Hertz as possible. The stiffener 34 preferably fits snugly within slots 36 machined in to the core 24 and the slots 36 are shaped complementarily to the stiffener 34 as shown. When so engaged the top surface of the stiffener 34 is flush with the top surface of the core 24 as can be appreciated in references to FIGS. 5 and 6. The stiffener 34 may be made of aluminum such as quarter inch thick 6061-T6 aluminum and holes are machined into the stiffener 34 as shown to accommodate the below-described inserts and fittings. The choice of materials is not limiting.

In the example non-limiting embodiment shown, the stiffener 34 has a central opening that is coaxial with the core 24 and that is circumscribed by a central enclosed hollow ring 38. Projecting radially outwardly from the central enclosed hollow ring 38 substantially to the outer periphery of the core 24 are plural azimuthally-spaced flat elongated stiffener arms 40. Completely enclosed AP openings 42, one for each AP 30, are formed between pairs of immediately adjacent long arms 40 and are radially outward of the central enclosed hollow ring 38 and partially defined thereby. Each AP opening 42 thus is defined in part by the central enclosed hollow ring 38, the two long arms 40 that bound the opening 42, and a respective outer peripheral segment 44, protruding radially outwardly from which substantially to the outer periphery of the core 24 is a respective stub arm 46. Accordingly, for each AP opening 42 there is a respective pair of radially-oriented long arms 40 and a respective radially-oriented stub arm 46, with the AP openings 42 being uniformly distributed in the azimuthal dimension defined by the core 24.

The top and bottom skins 26, 28 may be substantially continuous disks except for holes as shown to accommodate the below-described inserts and fittings. Specifically, in the three-AP embodiment shown in FIGS. 5 and 6 each skin 26, 28 is formed with three sets of twenty four insert holes 48, which each set being arranged in a circle and the circles being uniformly distributed in the azimuthal dimension defined by the core 24. It is to be understood however that the number of inserts (and thus insert holes 48) and their locations are established to match the AP 30 attachment system footprint.

Around their outer edges the skins 26, 28 are formed with fitting fastener holes 50 arranged in sets for four, with the circles of insert holes 48 being registered with respective AP openings 42 of the stiffener 34 and with respective circles of insert holes of the other skin. Likewise, the fitting fastener holes 50 are registered with like holes in the opposite skin and with fastener holes 52 in respective fittings 54 which are embedded in fitting receptacles 56 of the core 24 as more fully disclosed below. Like the below-described spool inserts for engaging the APs 30, the fittings 54, which engage the LV (specifically, which are bolted to the flange 22 shown in FIG. 4) may be potted into the core 24 using, e.g., EA9396.6MD potting compound. The skins 26, 28 may be made of aluminum such as 3/16 inch thick AL 6061-T6 aluminum.

Figure 9:
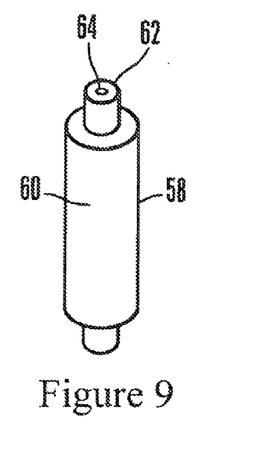
FIG. 9 is a perspective view of an example spool insert.

Spool-like inserts 58 are received in registered sets of insert holes 48 in the skins 26, 28, stiffener 34, and core 24 (insert holes in core 24 not shown). As intimated above, each set of circularly-arranged inserts 58 engages a release mechanism of a respective AP 30 to releasably couple the AP 30 to the core 24/stiffener 34/skins 26, 28 assembly. Referring briefly to FIG. 9, each insert 58 may have a radially large central cylinder 60 terminating at opposed coaxial radially smaller end cylinders 62, each of which may be formed with a respective central opening 64.

Figure 10:
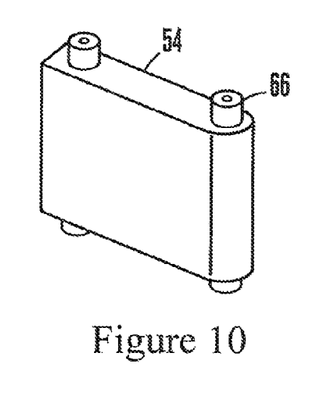
FIG. 10 is a perspective view of one of a pair of LV interface fittings.
Figure 11:
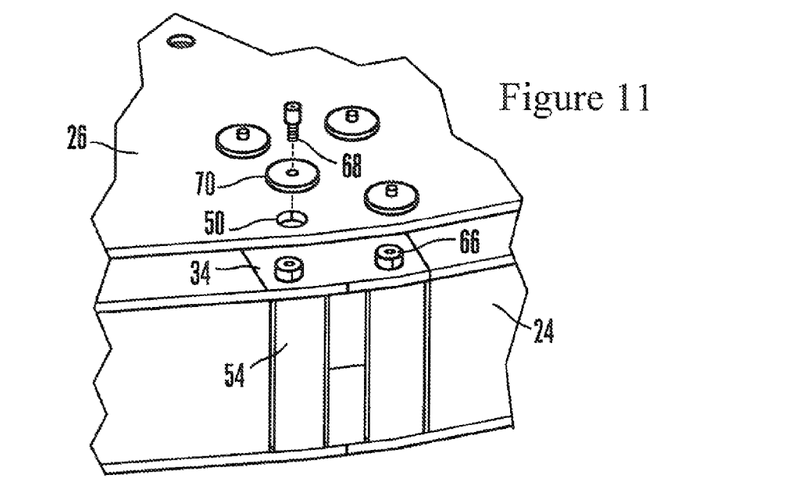
FIG. 11 is a perspective of part of an example platform with LV connectors shown in an exploded relationship.

Turning to the fittings 54, an example of which is shown in FIG. 10, the fittings 54 are arranged in pairs along the outer periphery of the core 24 as shown and when engaged with the fitting receptacles 56 of the core 24 are substantially flush with the top and bottom surfaces of the core 24. Briefly referring to FIG. 10, each fitting 54 is substantially parallel piped-shaped with opposed parallel hollow fastener receptacles 66, so that a pair of fittings 54 has four receptacles 66 that are registered with respective fastener holes 50 in the skins 26, 28. The ends of the receptacles 66 extend through the above-mentioned holes in the stiffener 34. Accordingly, as shown in brief reference to FIG. 11, respective fasteners 68 can extend through respective washers 70, fastener holes 50 in the top skin 26, and fastener receptacles 66 of a fitting 54 to securely hold the above-described assembly together and to the flange 22 shown in FIG. 4. Bottom fasteners (not shown) similarly can extend through the bottom skin 26 into bottoms of the receptacles 66. In any case, the inserts 58 and receptacles 54 may be made of the above-disclosed aluminum.

In some embodiments the skins, stiffener, and core are bonded together (using, e.g., FM300-2U adhesive) and bolted together using the above fasteners which may be "wet installed" using an appropriate adhesive such as EA9394. The adhesive can be injected as a fluid before it hardens thereby filling in the honeycomb core directly surrounding the fastener. This infilling increases the cores ability to "hold on to" the fastener by increasing the shear surface the fastener can interact with.

Completing the description of FIGS. 5 and 6, an auxiliary payload support unit (APSU) 72 is mounted on the top skin 26 for reasons to be shortly disclosed.

Figure 7:
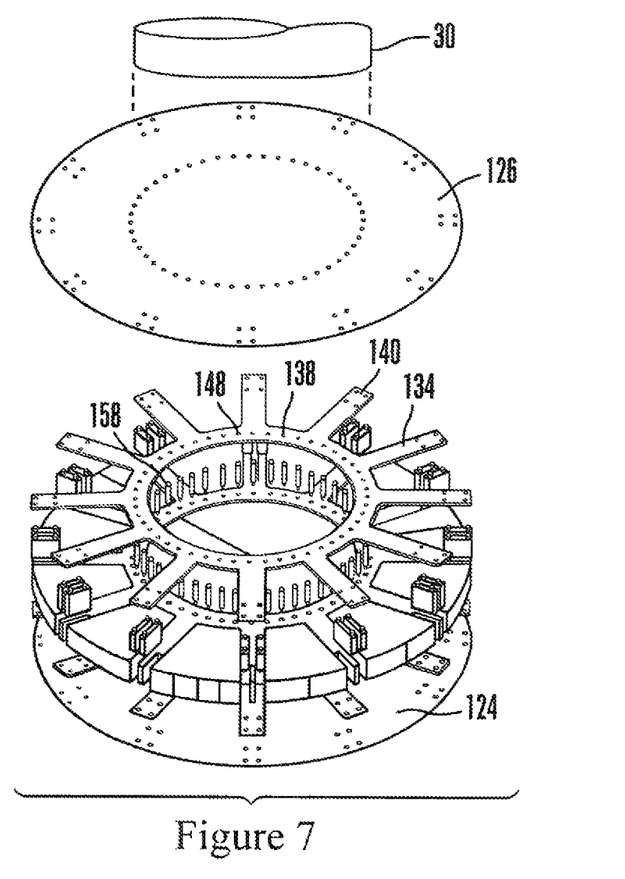
FIG. 7 is an exploded perspective view of an example platform configured for a single secondary spacecraft, with the secondary spacecraft partially broken away.
Figure 8:
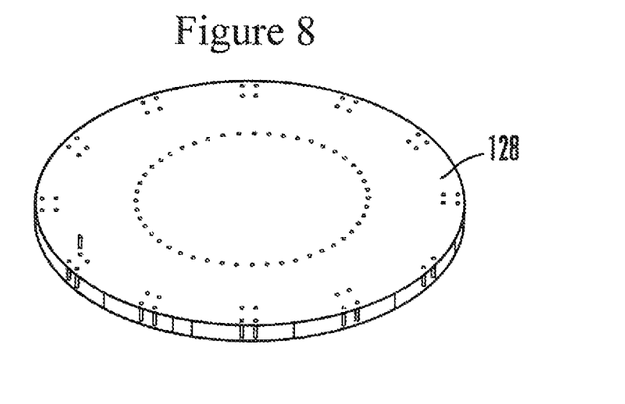
FIG. 8 is a perspective view of the platform shown in FIG. 7, with the spool inserts removed for clarity.

FIGS. 7 and 8 show an assembly which is in all essential respects identical to that shown in FIGS. 5 and 6, except that the assembly shown in FIGS. 7 and 8 is configured to support a single AP 30. Accordingly, a core 124 strengthened by a stiffener 134 is sandwiched between upper and lower skins 126, 128. The stiffener 134 has a central opening that is coaxial with the core 124 and that is circumscribed by a central enclosed hollow ring 138. Projecting radially outwardly from the central enclosed hollow ring 138 and extending substantially to the outer periphery of the core 124 are plural azimuthally-spaced flat elongated stiffener arms 140. Unlike the assembly shown in FIGS. 5 and 6, in FIGS. 7 and 8 the central hollow ring 138 is configured to engage the AP 30 and no other openings are formed in the stiffener, so that all the arms 140 are of the same length. Both the ring 138 and skins 126, 128 are formed with a single set of insert holes 148 arranged in a circle and the circles of the stiffener and skins being registered with each other to receive inserts 158 therein.

Figure 12:
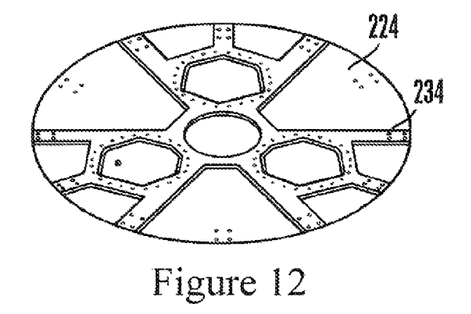
FIG. 12 is a perspective view of an alternate platform for three secondary spacecraft in which the strengthening web is made integrally with the structural skin.
Figure 13:
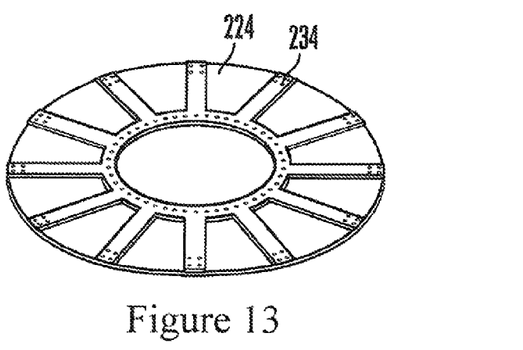
FIG. 13 is a perspective view of an alternate platform for a single secondary spacecraft in which the strengthening web is made integrally with the structural skin.

FIGS. 12 and 13 respectively three AP and single AP assemblies in which stiffeners 234 are machined as single parts with respective cores 224. The unitary cores/stiffeners shown in FIGS. 12 and 13 may be used in lieu of their counterparts in FIGS. 5 and 7, respectively.

Figure 14:
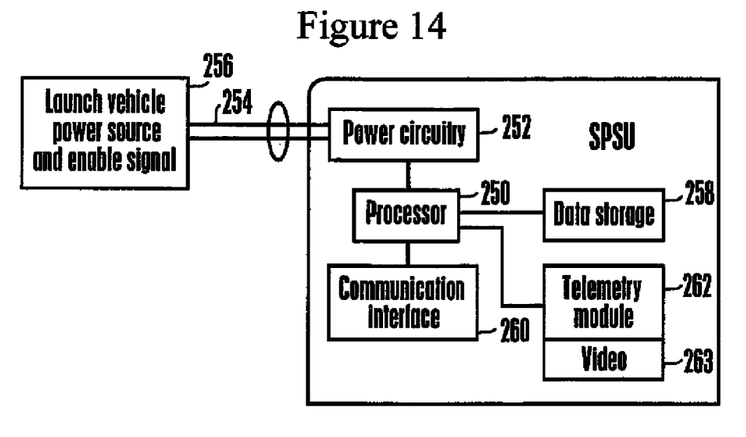
FIG. 14 is a functional block diagram of an example control module, referred to herein as an auxiliary payload support unit (APSU)

FIG. 14 shows a block diagram of an example APSU. A processor 250 communicates with power circuitry 252 that in turn receives, over a single electrical cable 254, power and enable signals from a source 256 including a power source, typically 28VDC, in the LV 10. The APSU 72 and the remainder of the AP 30 support assembly do not require any other electrical connections with the LV 10. The processor 250 also accesses computer readable data storage 258 such as disk-based and/or solid state storage for purposes to be shortly disclosed. The processor 250 may also access a wired or wireless communication interface 260; a telemetry module 262 and a video module (263) that may include an interface to, among other components, instruments or a video camera.

Figure 15:
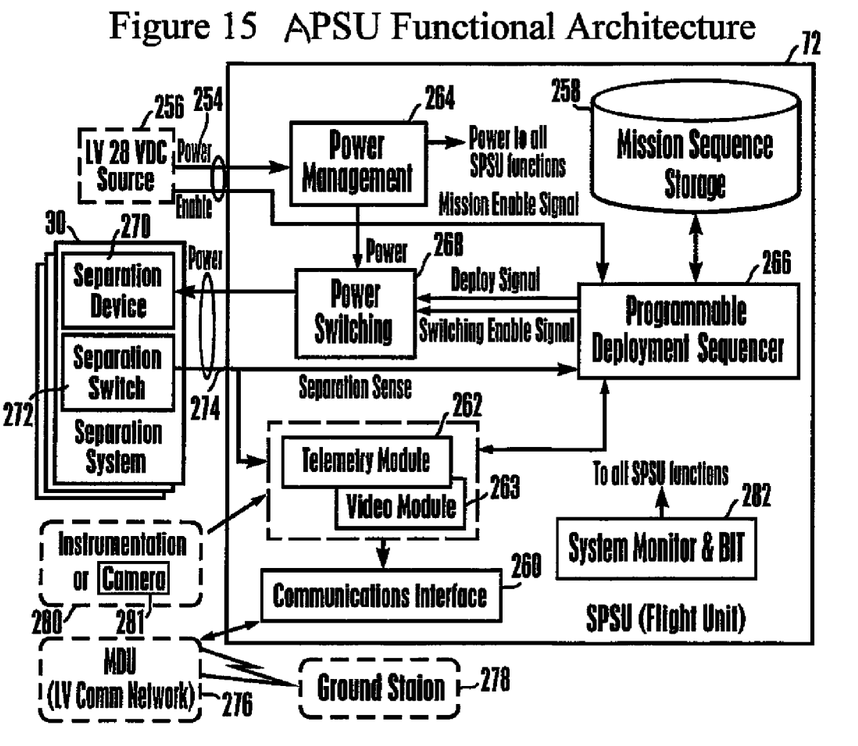
FIG. 15 is a functional flow diagram with additional detail and interfaces of the APSU shown in FIG. 14.

FIG. 15 shows a combined functional flow and hardware block diagram to illustrate additional features of the APSU 72. A power management function 264 may be undertaken by the processor 250 and/or power circuitry 252 to supply power to the various components of the APSU 72 and to the various APs 30 (three shown in FIG. 15). Mission sequences, e.g., AP 30 launch sequences, may be stored in the storage 258 for access by a programmable deployment sequencer function 266 that may be implemented by the processor 250 in accordance with logic set forth further below.

The power management function 264 may communicate with a power switching function 268, also implemented or controlled by the processor 250, which receives deploy signals from the programmable deployment sequencer 266 indicating when a particular AP 30 should begin to receive power from the power management function 264, with the power switching function 268 sending power to the AP 30 indicated by the deploy signal. An AP 30 typically includes a separation device 270 that engages the inserts described above and a separation switch 272 that sends an separation signal to the programmable deployment sequencer 266, to inform of successful separation event. As was the case with the sole cable connection 254 between the APSU 72 and LV 10, a sole respective cable 274 connects the APSU 72 to each AP 30.

FIG. 15 shows that the APSU 72 communicates through the communications interface 260 with the communication network 276 of the LV 10 and thence to a ground station 278. Also, the telemetry module 262 may receive input from various instrumentation 280 on the LV 10 and may sense separation of an AP 30 as shown, to activate a telemetry function to commence, e.g., generating video of an AP as it releases from the LV. The telemetry module 262 may also be controlled by or actuated by the programmable deployment sequencer function 266 as shown. A system monitor function 282 may be provided as part of the APSU 72 (and executed by, e.g., the processor 250) to monitor APSU functions and components for housekeeping and watchdog functions or provide updates thereon to the ground station 278.

Figure 16:
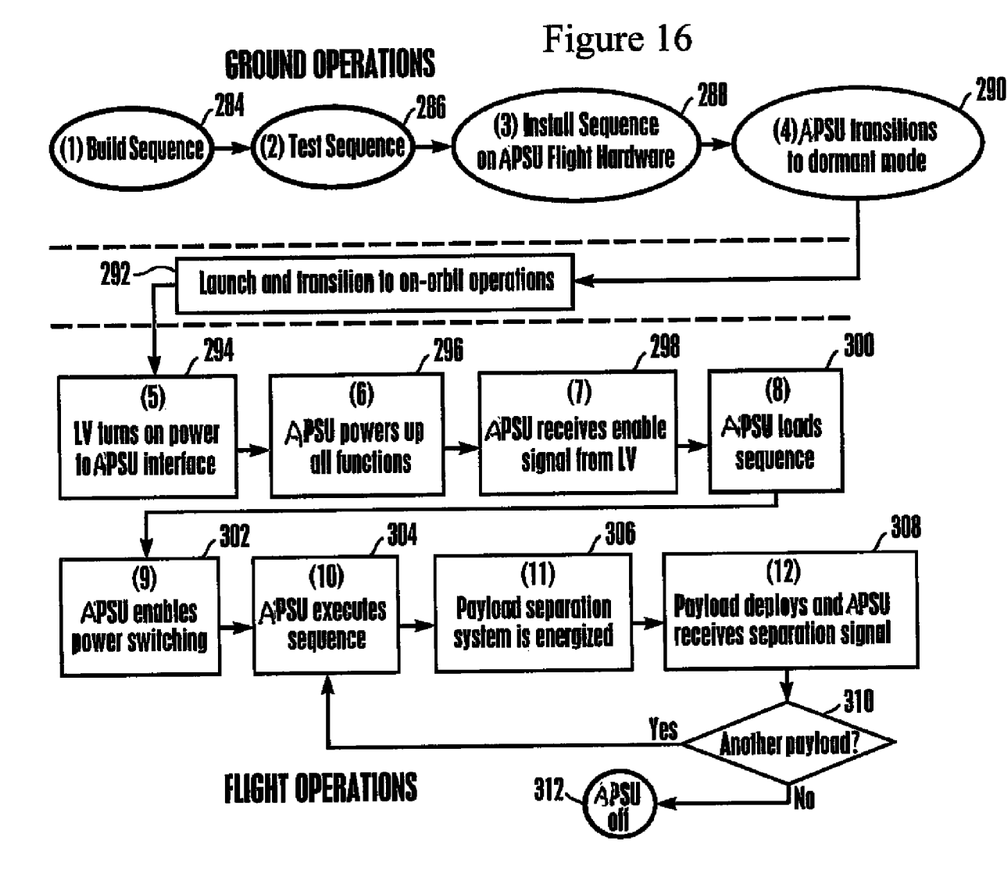
FIG. 16 is a flow chart for a typical mission of example logic including launch initiation logic that the APSU may execute in accordance with present principles.

FIG. 16 shows example logic that may be implemented in accordance with present principles. The first four steps are ground operations and are presented for completeness. At step 284 the AP 30 deployment sequence is built or created, including which AP 30 will be launched from the LV 10 when during the flight of the LV 10. The sequence may be tested at step 286 in accordance with test principles known in the art and then copied in software form onto, e.g., the storage 258 at step 288. At step 290, once the launch sequence has been received and other ancillary commands programmed into it, the APSU 72 transitions to a dormant mode for launch, in which it consumes little or no power.

Launch and transition to orbital operations begins at step 292, after which, at step 294, the LV 10 commences sending power to the APSU 72, which powers up and commences executing its logic at step 296. Proceeding to step 298 the APSU 72 receives an enable signal from the LV 10 prior to which the APSU 72 cannot begin executing a launch sequence for any AP 30. In this way, a safety interlock is provided to the LV 10, which controls when the APSU can begin executing AP 30 release but which does not thereafter have to command or communicate anything to the APSU, relieving the LV 10 of the burden of controlling launch of the AP 30.

Responsive to the enable signal at step 298, the APSU proceeds to step 300 to load the launch sequence from, e.g., storage 258 to working memory of the processor 250. At step 302 the APSU 72 enables power switching (from the power switching function 268 to the APs 30) so that as the APSU 72 executes the launch sequence logic at step 304, the separation device(s) 270 of the AP(s) 30 can be energized at step 306 on time as appropriate to ensure AP launch on schedule. At step 308, separation device 270 is activated to deploy the AP into space, leaving the LV 10. Simultaneously at step 308, separation switch 272 is activated to signal separation to the APSU 72. Responsive to receiving the separation signal, at decision diamond 310 the APSU 72 determines whether another AP 30 awaits release and if so, loops back to step 304 to execute the release of the other AP 30; otherwise, in the event that the last AP 30 has been deployed, the APSU 72 deenergizes itself at state 312 to return to dormant mode as in step 290.

Figure 17:
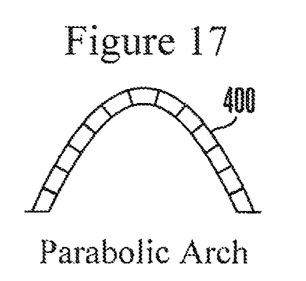
FIGS. 17-21 are side elevational views of alternate shapes that the may be used for the honeycomb core, with FIG. 21 showing a core in relation to a launch vehicle.
Figure 18:
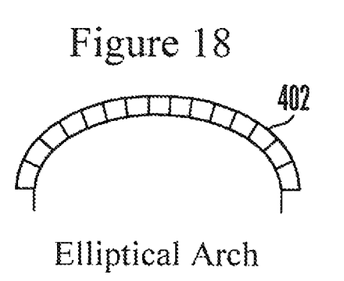
Figure 19:
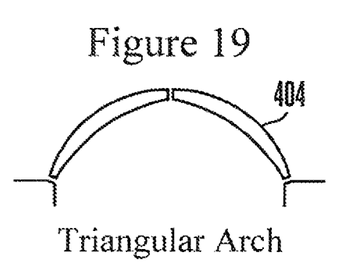
Figure 20:
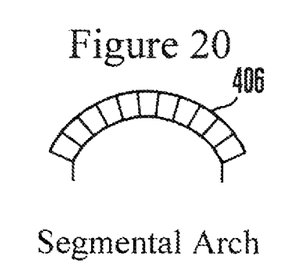
Figure 21:
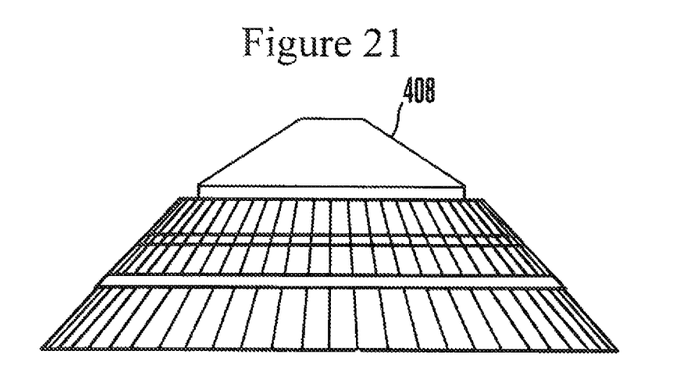

FIGS. 17-21 illustrate that the above-described honeycomb core which is sandwiched between structural skins may have shapes other than disk-shaped. For example, as shown in FIG. 17 a core 400 may be shaped in side elevational view as a parabola, whereas FIG. 18 shows a core that may be shaped as an ellipse. FIG. 19 illustrates a core 404 shaped as a triangular arch while FIG. 20 shows a core 406 shaped as a segmental arch. Yet again, as shown in FIG. 21 as core 408 may be shaped as a right circular frustum. Respective structural skins may be provided on the upper and lower (or inner and outer) surfaces of the cores shown in FIGS. 17-21 in accordance with disclosure above. The core that is made of aluminum honeycomb may be shaped using a free form tool to support one or more APs.

While the particular PLATFORM AND LAUNCH INITIATION SYSTEM FOR SECONDARY SPACECRAFT FOR LAUNCH VEHICLE is herein shown and described in detail, it is to be understood that the subject matter which is encompassed by the present invention is limited only by the claims.

What is claimed is:

1. A auxiliary payload support unit (APSU) for coordinating release of at least one auxiliary payload (AP) from an AP support assembly of the APSU, the APSU being engageable with a launch vehicle (LV), the APSU comprising:

at least one processor associated with a deployment sequencer at least indicating when a particular AP associated with the APSU should begin to receive power;

at least one communications interface between processor and LV;

at least one computer readable data storage medium accessible to the processor and bearing instructions executable by the processor; wherein the APSU is configured to communicate with the LV through a cable, the processor when executing the instructions being configured for receiving, post-launch of the LV, an enable signal from the LV prior to which the deployment sequencer cannot begin causing power to be sent to any AP and the processor cannot begin executing a launch sequence for any AP such that the LV controls when the APSU begins executing AP release, the processor when executing the instructions being configured for, responsive to receiving the enable signal, executing the deployment sequencer to power at least one AP on the APSU and execute a launch sequence for the at least one AP on the APSU such that the LV need not, after sending the enable signal to the APSU, thereafter command or communicate anything to the APSU regarding AP release, relieving the LV of the burden of controlling launch of the AP, the deployment sequencer being configured for receiving from an AP a separation signal indicating the AP is separated from the APSU.

2. The APSU of claim 1, wherein the processor, responsive to the enable signal, enables power switching to the AP such that a separation device of the AP is energized as appropriate to ensure AP launch on schedule.

3. The APSU of claim 1, wherein the processor when executing the instructions is configured to receive from the AP a separation signal indicating AP separation from the APSU.

4. The APSU of claim 3, wherein the processor when executing the instructions, responsive to receiving the separation signal, determines whether another AP awaits release from the APSU and if so, enables release of the AP.

5. The APSU of claim 3, wherein the processor when executing the instructions, responsive to receiving the separation signal, determines whether another AP awaits release from the APSU and if not, deenergizes itself.

* * * * *

UNITED STATES PATENT AND TRADEMARK OFFICE
CERTIFICATE OF CORRECTION

| | | |
|---|---|---|
| PATENT NO. | : 8,608,114 B2 | Page 1 of 1 |
| APPLICATION NO. | : 13/066471 | |
| DATED | : December 17, 2013 | |
| INVENTOR(S) | : Philip Smith et al. | |

It is certified that error appears in the above-identified patent and that said Letters Patent is hereby corrected as shown below:

In the Specification

Column 1, line 4, please insert -- This invention was made with Government support under Contract NNX11CG34P awarded by NASA. The Government has certain rights in this invention. --

Signed and Sealed this
Eighteenth Day of March, 2014

Michelle K. Lee
*Deputy Director of the United States Patent and Trademark Office*